United States Patent
Zavada et al.

(10) Patent No.: US 7,263,375 B2
(45) Date of Patent: Aug. 28, 2007

(54) PERSONAL NAVIGATION ASSISTANT SYSTEM AND APPARATUS

(75) Inventors: Joseph J. Zavada, Hatfield, PA (US); Oliver A. Garrison, King of Prussia, PA (US); Mitchell J. Maifeld, Waverly, TN (US)

(73) Assignee: Lockheed Martin Corporation, Bethesda, MD (US)

( * ) Notice: Subject to any disclaimer, the term of this patent is extended or adjusted under 35 U.S.C. 154(b) by 102 days.

(21) Appl. No.: 11/018,607

(22) Filed: Dec. 21, 2004

(65) Prior Publication Data

US 2006/0135183 A1 Jun. 22, 2006

(51) Int. Cl.
 *H04Q 7/20* (2006.01)
(52) U.S. Cl. .............................. 455/456.6; 455/456.5; 455/456.1; 701/200; 701/201; 342/357; 342/357.08
(58) Field of Classification Search ............. 455/456.5, 455/456.6, 456.1; 701/200, 201; 342/357, 342/357.08; 340/995.23
 See application file for complete search history.

(56) References Cited

U.S. PATENT DOCUMENTS

| 5,873,041 | A  | * | 2/1999 | Ishii ........................... 455/457 |
| 7,035,650 | B1 | * | 4/2006 | Moskowitz et al. ..... 455/456.5 |
| 2002/0013153 | A1 | * | 1/2002 | Wilcock et al. ............. 455/456 |
| 2002/0045455 | A1 | * | 4/2002 | Spratt .......................... 455/456 |
| 2003/0195005 | A1 | * | 10/2003 | Ebata .......................... 455/445 |
| 2004/0024522 | A1 | * | 2/2004 | Walker et al. .............. 701/210 |
| 2004/0198395 | A1 | * | 10/2004 | Kimoto et al. ........... 455/456.1 |

* cited by examiner

*Primary Examiner*—Danh Le
(74) *Attorney, Agent, or Firm*—Duane Morris, LLP

(57) ABSTRACT

A personal location system including signal-transmitting RFID tags associated with various landmarks, such as hallways of buildings. The system's personal receiver is preloaded with information about the building, equivalent to a map, and receives the RFID signals. These signals, in conjunction with the stored map, allow the environment to be displayed, and the location of the user to be identified. The receiver may be loaded with the map information by means of a device(s) located at the entrance(s) of the building.

4 Claims, 6 Drawing Sheets

PERSONAL NAVIGATION ASSISTANT SYSTEM AND APPARATUS

FIELD OF THE INVENTION

This invention relates to apparatus, system and methods for identifying to a person within a building his location relative to his surroundings.

BACKGROUND OF THE INVENTION

Modern society is characterized, in part, by very large edifices, buildings or structures. In general, a person who is newly introduced to large building cannot use his knowledge of other buildings to navigate within the particular building in which he finds himself. While merely inconvenient for visitors, this difficulty in navigation can be of great importance to emergency personnel. In the event of an emergency, rescue personnel must expediently navigate the building without prior knowledge of that building, and under adverse conditions such as flame, heat, smoke, noise, and the like. The adverse condition may even include hostile terrorist action directed against those within the building.

Maps of the building, whether portable or affixed to walls of the building at particular locations, can be useful. However, most people do not carry maps of the building in which they happen to be present. Those maps which are affixed to a wall may or may not be up-to-date, but in any case are not likely to be located where they are needed, especially in an emergency.

Another possible way to identify one's location within a building is to use a cell-phone to contact someone familiar with the building, explain as best one can where one is, then obtain directions to the desired location. However, cell-phone reception may be unreliable, especially in adverse circumstances. Also, some high-security buildings are constructed so as to prevent cell-phone signal propagation. Even if cell-phone communications are available, the necessity of identifying one's location to the person familiar with the building may be time-consuming and prone to error. Lastly, this technique may not be usable unless one is able to contact a person familiar with the building, who is also willing and able to provide directions. If the person requiring directions within the building does not happen to know the cell-phone number of such a person, even good cell-phone communications are unavailing.

Portable Global Positioning System (GPS) receivers could, in principle, provide the latitude and longitude of a person's location in a building, if the structure of the building were such as to allow the GPS signals to reach the GPS receiver. However, most large buildings are made with a steel framework, which together with the large amount of lossy and reflective dielectric material of the structure tend to make GPS reception spotty or unreliable. Even if a GPS signal is available, the latitude, longitude and altitude information is not particularly useful in the confines of a building without proper correlation to a location on a map of the building. The civilian accuracy of un-aided GPS is not sufficient to properly place a user in a hallway instead of in a room off the hallway.

Improved arrangements are desired for personal and personnel location within buildings.

SUMMARY OF THE INVENTION

A system according to an aspect of the invention comprises a transmitter unit at a known, fixed location within a building, transmitting a wireless signal unique to that location. A portable receiver or receiver/reader/memory is located somewhere with the building, for receiving the wireless signal transmissions from the transmitter unit. A processor is associated with the portable receiver, for storing information relating to the physical environment around at least the known location and information identifying the signal unique to the location, and for processing the signal unique to the location in conjunction with the information relating to the physical environment, for producing a human-sensible indication of the known location relative to the environment, such as a map of the environment around at least the known location. In one advantageous embodiment, the processor portion of the system is able to plot a route from the current location to a user-specified destination. In addition, the map may indicate a proposed direction of travel to progress toward a destination. Ideally, the processor is co-located with the portable receiver.

In one version of the system, the receiver unit corresponds with the processor unit, communicating the identities of the signal(s) it receives. In a particularly advantageous version, the communication between receiver and processor not only contains received signal identities, but also received signal strengths in a normalized, relative measurement. In such a system, the signal information representative of the strength of the wireless signal is processed to determine which signal of numerous signals is strongest and presumed to be within closest proximity, which is second, and so on until all sufficiently-received signals are ranked.

In another version, a memory segment or log allocates space for storing signal identities provided to the processor, together with the time at which they were received, and signal strength if applicable in the particular system's design.

An electromagnetic signal transmitter unit according to another aspect of the invention comprises a memory for storing at least one of a static or selectable code representative of a particular fixed location of the transmitter unit, and an electromagnetic signal generator operating at a frequency in an Industrial, Scientific, and Medical band, for generating signals to be transmitted, which signals are modulated by the code. A directive antenna arrangement is coupled to the electromagnetic signal generator, for directing electromagnetic radiation in a desired direction, and timing means coupled to at least one of the memory, the electromagnetic signal generator, and the antenna arrangement, for recurrently enabling transmission of the electromagnetic signals. The timing means causes the recurrence more frequently than every ten seconds, and more preferably about every five seconds.

In one version of a system according to an aspect of the invention, the radiation patterns of the transmitters are intentionally selected, in conjunction with the installation of the transmitters at fixed locations, in such a manner that overlap is reduced to a minimum. In another type of installation, the radiated energy patterns are selected in conjunction with the installation locations of the transmitters so as to partially overlap.

According to an aspect of the invention, the transmitted power from each transmitter is no greater than one of 50 millivolts per meter and 0.75 μwatts EIRP at three meters. In some versions, the power source for the transmitters is provided in whole or in part from the power mains. In at least one aspect, the power for the transmitters is provided, at least in part, by solar cells.

A portable unit according to yet another aspect of the invention is for, in a building, receiving signals from a transmitter unit at a known, fixed location within the building. The transmitter unit transmits a wireless signal unique to that known fixed location. The portable unit comprises a processor/display/memory arrangement, for storing information relating to the physical environment around at least the known location, and information identifying the signal unique to the location. The processor/display/memory arrangement processes the signal unique to the location in conjunction with the information relating to the physical environment, for producing a human-sensible indication of the known location relative to the environment. The human-sensible indication may be a map.

A system according to an aspect of the invention comprises a transmitter unit at a known, fixed location within a building. The transmitter unit transmits a wireless signal unique to that known, fixed location. The system also comprises a portable receiver or receiver/reader/memory ("receiver") located within the building, for receiving the wireless signal transmissions from the transmitter unit. Wireless signal transmissions from the transmitter unit will be received by the portable receiver only at locations near the fixed location, as for example by limiting the transmitter unit that produces the wireless signal to a particularly low Equivalent Isotropic Radiated Power (EIRP). The system further comprises a processor associated with the portable receiver, for storing information relating to the physical environment around at least the known location, and for storing information identifying the signal unique to the location. The information relating to the physical environment may include information about hallways and rooms in the area. The portable receiver also processes the signal unique to the location, in conjunction with the information relating to the physical environment, for producing a human-sensible indication of the known location relative to the environment. The human-sensible indication may be a voice, a map, or like indications. Other indications may include proposed direction of travel to an intended destination within the building. The processor portion is also capable of plotting a route from the current user location to a user-specified destination and displaying to the user the above indications necessary at each turn and intervals between for the user to transit the distance from his location to the destination. In a preferred embodiment of the invention, the processor is co-located with the portable receiver. In one embodiment, the portable receiver may produce information representative of the identities and/or strength of the wireless signal or signals at the receiver. This processing may include evaluation of the strength of the received wireless signal to determine if the wireless signal or signals have strength indicative of being within a given range of the transmitter unit, or of being stronger or weaker than alternative signals and may rank those signals in order of strength. The signal identities, and strengths if applicable, and time of receipt are stored in a memory segment, known as a log.

According to another aspect of the invention, an electromagnetic signal transmitter unit comprises a memory for storing a static or selectable code representative of a particular fixed location of the transmitter unit, and an electromagnetic signal generator operating at a frequency in one of the Industrial, Scientific, and Medical bands, for generating signals to be transmitted, carrying the static or selectable code. A directive antenna arrangement is coupled to the electromagnetic signal generator, for directing electromagnetic radiation in a dipole pattern. In one possible embodiment, the general directions of radiation are parallel to a hallway in which the fixed location lies. Timing means are coupled or embedded in the electromagnetic signal generator for recurrently enabling transmission of the electromagnetic signals. The recurrence is preferably more often than every ten seconds, and more preferably at least every five seconds. To extend battery life, the recurrence is only as frequent as necessary and the radiated power as small as possible for the intended application. When the infrastructure design calls only for coarse location identification, these transmitter units can be located very far apart and their radiation patterns specifically designed in a small-sized, low-powered and non-overlapping configuration. If finer-grained positioning is necessary, the transmitter units could be configured to overlap their radiation patterns and the receiver and processor could use the identities and signal strengths of received transmissions to refine the user's location. In a particularly advantageous embodiment of this aspect, the electromagnetic signal radiated by the antenna arrangement provides a strength of (either) one of 50 millivolts per meter and 0.75 µwatts EIRP at three meters. These transmitter units are powered from a battery source, but power may also be supplemented or completely supplied through building-supplied wired standard alternating current or specially wired direct current supplies to the transmitters. Power for the transmitters could also be supplemented or supplied through solar cells which are aimed to take advantage of either sunlight through windows and/or incident fluorescent light from the installed hallway illumination.

According to a further aspect of the invention, a portable unit is for, in a building, receiving signals from a transmitter unit at a known, fixed location within the building. In this aspect, the transmitter unit transmits a wireless signal unique to that known, fixed location. A processor is associated with the portable unit, for storing information relating to (a) the physical environment around at least the known location and (b) information identifying the signal unique to the location. The processor interprets the signal unique to the location in conjunction with the information relating to the physical environment to produce a human-sensible indication of the known location relative to the environment. The human-sensible indication may be by way of visual display.

BRIEF DESCRIPTION OF THE DRAWING

FIG. 2b is a simplified representation of an alternative power supply portion of the arrangement of FIG. 2a;

DESCRIPTION OF THE INVENTION

Figure 1:
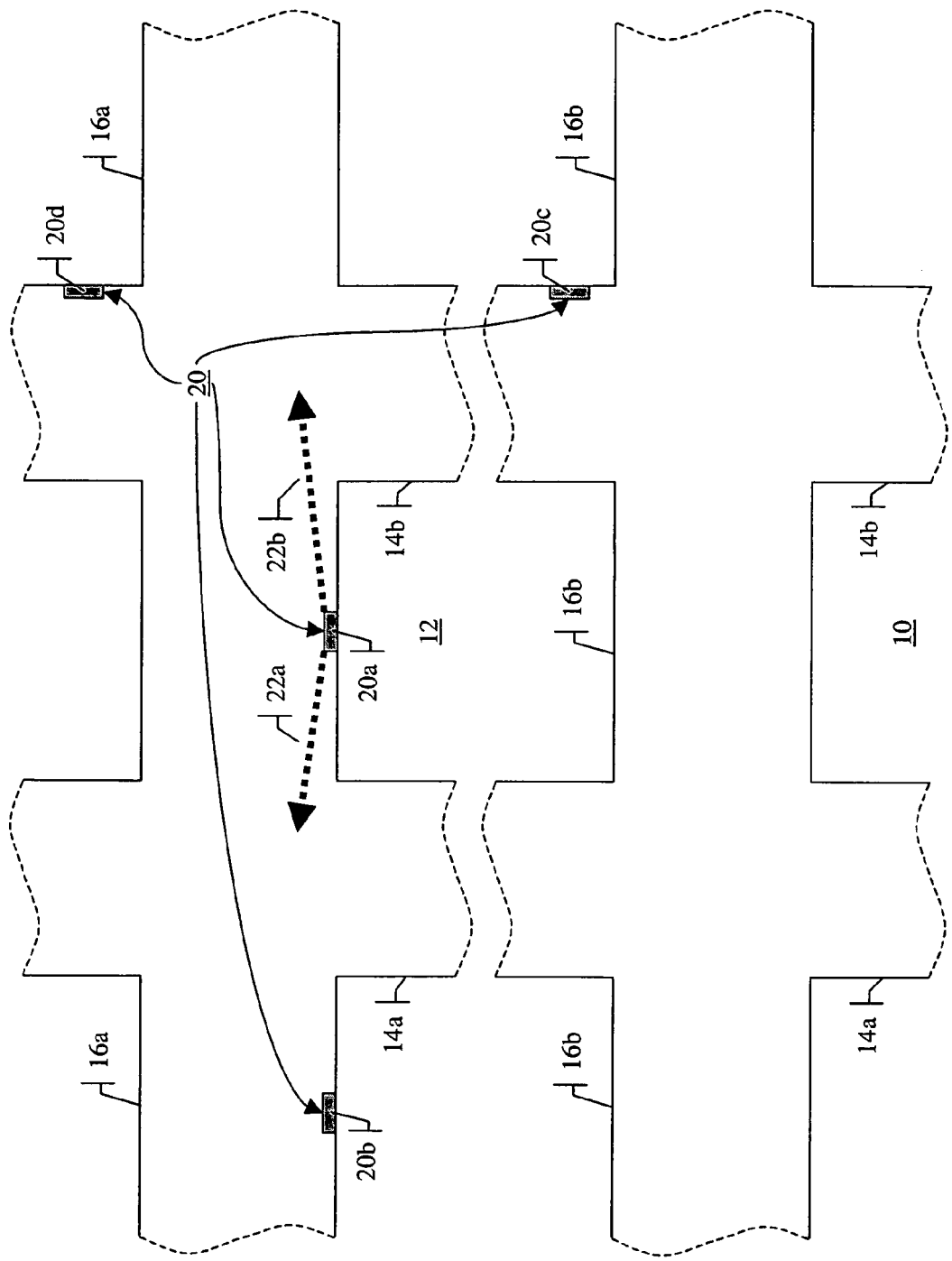
FIG. 1 is a nominal hallway layout.

FIG. 1 is a simplified plan view of some hallways on one floor of a multistory building 10. In FIG. 1, a grid 12 includes intersecting hallways 14a, 14b, 16a and 16b. Hallways 14a and 14b are mutually parallel and hallways 16a and 16b are mutually parallel and orthogonal to hallways 14a and 14b. As illustrated in FIG. 1, an electromagnetic signal transmitter unit 20a of a set 20 of transmitter units is located against a wall of hallway 16a, at a fixed location lying between cross hallways 14a and 14b. According to an aspect of the invention, transmitter unit 20a transmits an electromagnetic signal. The signals are transmitted with low power, directed generally parallel to hallway 16a, as represented in FIG. 1 by dash lines 22a and 22b.

According to an aspect of the invention, the transmitter unit 20a of FIG. 1 modulates the transmitted electromagnetic radiation with a code that is unique to the particular fixed location at which transmitter unit 20a is located. Other corresponding transmitter units, some of which are designated 20b, 20c, and 20d, may transmit at the same frequency or at different frequencies within an ISM band. Wherever permanently located in the building 10, or whatever the operating frequency, each transmitter unit of set 20 of transmitter units of FIG. 1 modulates its electromagnetic transmissions with a unique code, different from the codes used by transmitter units at any other location.

Figure 2:
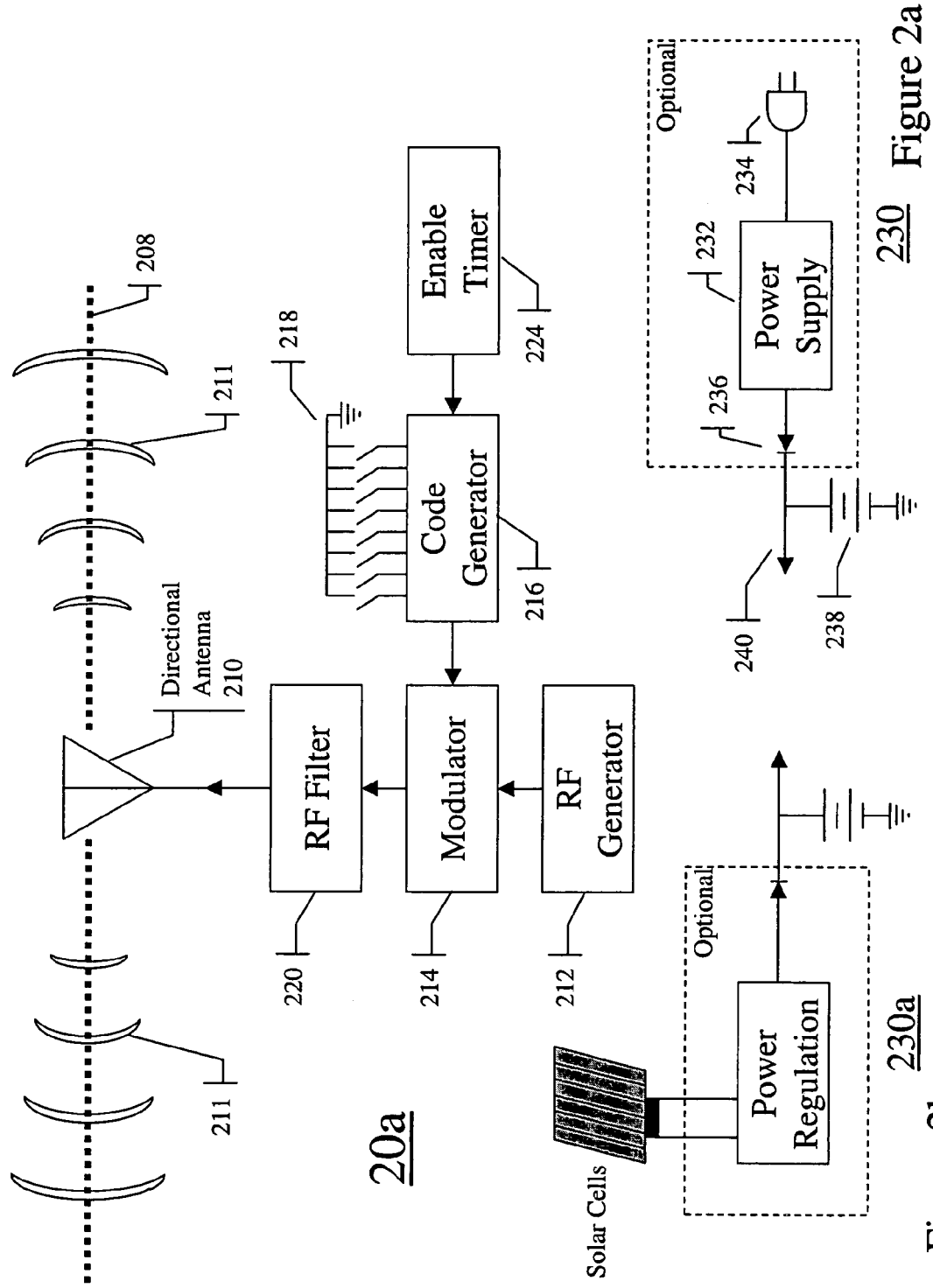
FIG. 2 is a simplified block diagram of one possible embodiment of a transmitter according to an aspect of the invention.

FIG. 2 is a simplified block diagram of a possible embodiment of one of the transmitter units of FIG. 1. For definiteness, the transmitter unit of FIG. 2 is transmitter unit 20a of FIG. 1. In FIG. 2, transmitter 20a includes a directional antenna 210 which produces RF radiation 211 in a radiation pattern which is adapted to principally illuminate the desired areas in which the transmitter unit is mounted. Ideally, for a hallway, the radiation pattern would be conical and symmetrically disposed around an axis 208 extending parallel with the associated hallway. A less desirable alternative would be radiation generally in a plane, where the plane includes the axis 208.

In FIG. 2, a radio frequency (RF) generator 212 produces signal at one or more frequencies within one of the Industrial, Scientific, and Medical (ISM) bands in the approximate range of 902 to 928 MHz. The RF signal is applied from RF generator 212 to a modulator illustrated as a block 214, which receives code signals from a code generator 216 and modulates the RF signal with the code. The characteristics of the code may be stored in a memory, such as the "mechanical switch" memory illustrated as 218, or possibly in a solid-state read-only memory or ROM (not illustrated). A timer illustrated as a block 224 recurrently enables code generator 216, as for example every five seconds, so that the RF signal is modulated by the code every five seconds. For conservation of battery power, if desired, the RF generator 212 may also be enabled concurrently with the enabling of the modulator 214. The code-modulated signal is applied from modulator block 214 to an RF filter 220, which filters the modulated signal to remove unwanted frequency components which may arise due to the modulation process and for other reasons. The modulated, filtered signal is applied from filter 220 to directional antenna 210.

In FIG. 2a, a power supply designated generally as 230 includes a direct voltage source or power supply 232 which is powered from the alternating-current mains, as suggested by plug 234. The direct voltage produced by power supply 232 when the mains are operational is applied through a reverse-current blocking arrangement illustrated as a diode 236 to a rechargeable battery or other storage device designated 238. Power for those various blocks 212, 214, 216, 218, 220, and 224 of FIG. 2 which require energization is provided by storage device 238 over a path 240. During those times in which the power mains are operational, battery 238 maintains a charge. If the mains should fail, battery 238 maintains device operation for some minimum time deemed adequate for most situations. Alternatively, an energy-efficient design would allow the transmitter to function for years without being connected to alternating current mains, making the connection to said mains through 232, 234, and 236 optional. In FIG. 2b, 230a shows how a solar cell arrangement can be utilized to supply power. The solar cell arrangement is powered by ambient hallway or environmental lighting, which may be limited to artificial lighting in some cases.

The power consumption of transmitters such as transmitter 20a are optimally such that their current draw is very low. This low power requirement allows the transmitter/tag to be powered from a small-format battery source. The minimal power required could also be completely, or more probably supplementally, supplied by a solar cell. This solar cell could be aimed to take advantage of any incident sunlight that may come from a nearby window and excess power would be used to recharge the battery for nighttime transmissions. Lacking such a window, incident photons supplied by a fluorescent light would be available both in daytime and nighttime and could provide sufficient energy to power the transmitter.

In operation of the transmitter 20a of FIG. 2, the memory 218 is preloaded with a code that is unique to the location at which the transmitter is located. In this particular case, the location of transmitter 20a is on a wall of hallway 16a, as illustrated in FIG. 1. The transmitter 20a recurrently produces a directional beam of radio-frequency energy along the associated hallway, with the radio-frequency energy modulated to carry the code. Ideally, the code is totally unique to the location, at least in the particular building in which the transmitter is mounted.

The power density or field strength transmitted by the transmitters of FIG. 1, and in particular by the transmitter of FIG. 2, can be selected by controlling the power applied to the antenna 210 in conjunction with its directivity, as known to those skilled in the antenna arts. For operation pursuant to FCC part 15, the allowable field strength at the transmitter is 50 millivolts (mV) per meter, corresponding to 0.75 microwatts (µW) EIRP at 3 meters from the transmitter. In one embodiment of the transmitter aspect of the invention, the code data burst has a duration of 3.2 milliseconds (ms) every five seconds.

Figure 3:
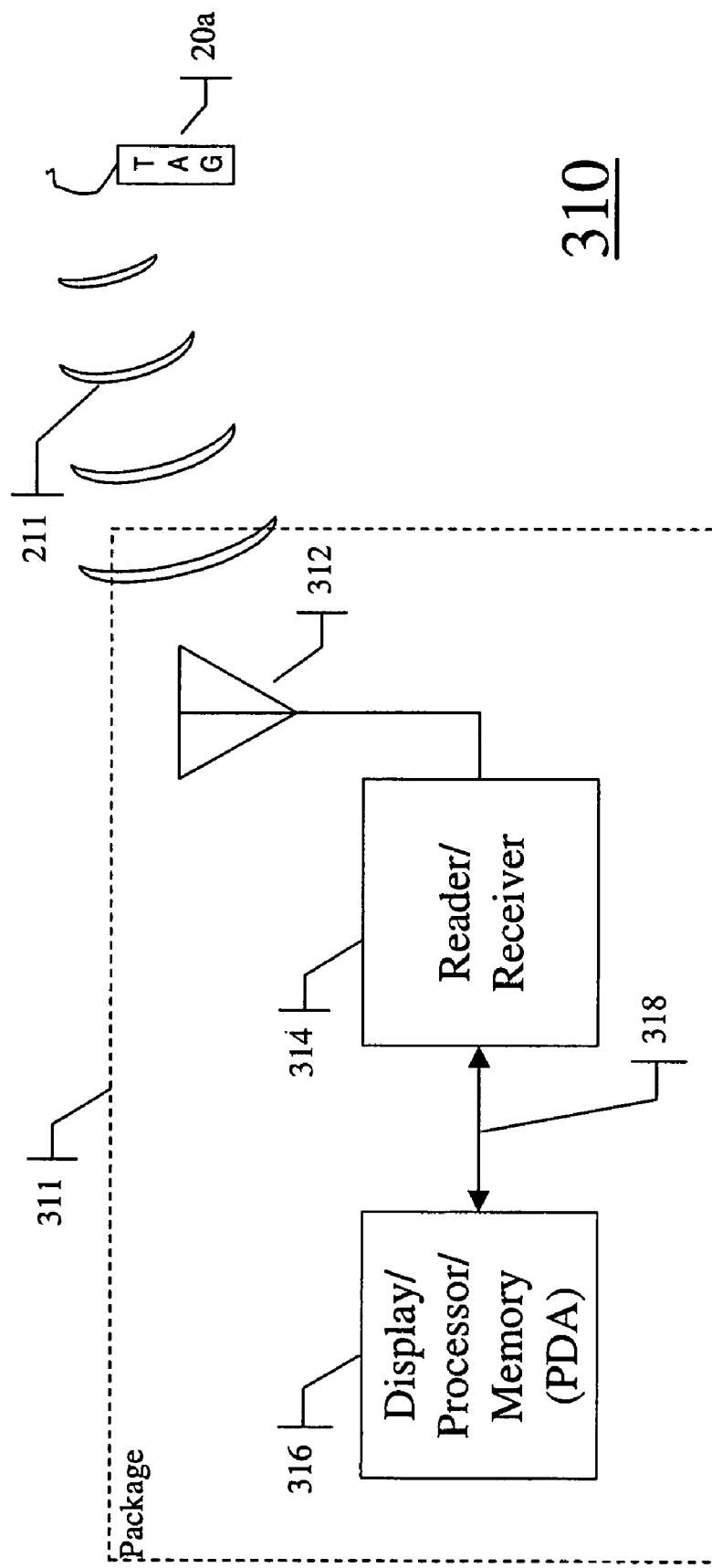
FIG. 3 is a simplified block diagram of one possible embodiment of a receiver/processor/memory according to an aspect of the invention.

According to another aspect of the invention, an RF receiver is associated with a personal human-interface device (HID) or "display/processor/memory" ("receiver"), which incorporates some processing and memory capability. FIG. 3 is a simplified block diagram of an RF receiver associated with a HID/processor. In FIG. 3, transmitter 20a is designated as a "tag," reflecting its similarity to a radio frequency identification (RFID) tag. For definiteness, the tag/transmitter unit of FIG. 3 is transmitter unit 20a of FIG. 1. RFID tag 20a of FIG. 3 transmits the signal illustrated as crescents, just as in FIG. 2a where the crescents are designated 211, toward a portable arrangement designated generally as 311. Arrangement 311 includes a receiving antenna 312 which receives signals 211, and a receiver or reader 314 which receives the RF signal, demodulates the signal, and performs such other processing which may be useful, such as amplification and conversion into a format which can be accepted by the display/processing/memory device 316. In that situation in which the display/processing/memory device is a Personal Digital Assistant (PDA), receiver/reader/memory 314 might convert the received demodulated code into an asynchronous serial format for communication to the display/processor/memory 316 over interface 318. Thus, the arrangement 311 of FIG. 3, when present anywhere in hallway 16a of FIG. 1, would be expected to receive, inter alia, the unique code representing the location of transmitter 20a of FIG. 1. As a result, display/processor/memory device (HID) 316 of FIG. 3 would also be expected to receive the unique code representing the location of transmitter 20a of FIG. 1. The arrangement 311 of FIG. 3, present in any hallway of FIG. 1 and possibly receiving transmissions such as that from transmitter 20a of FIG. 1, is considered the system 310.

Figure 6:
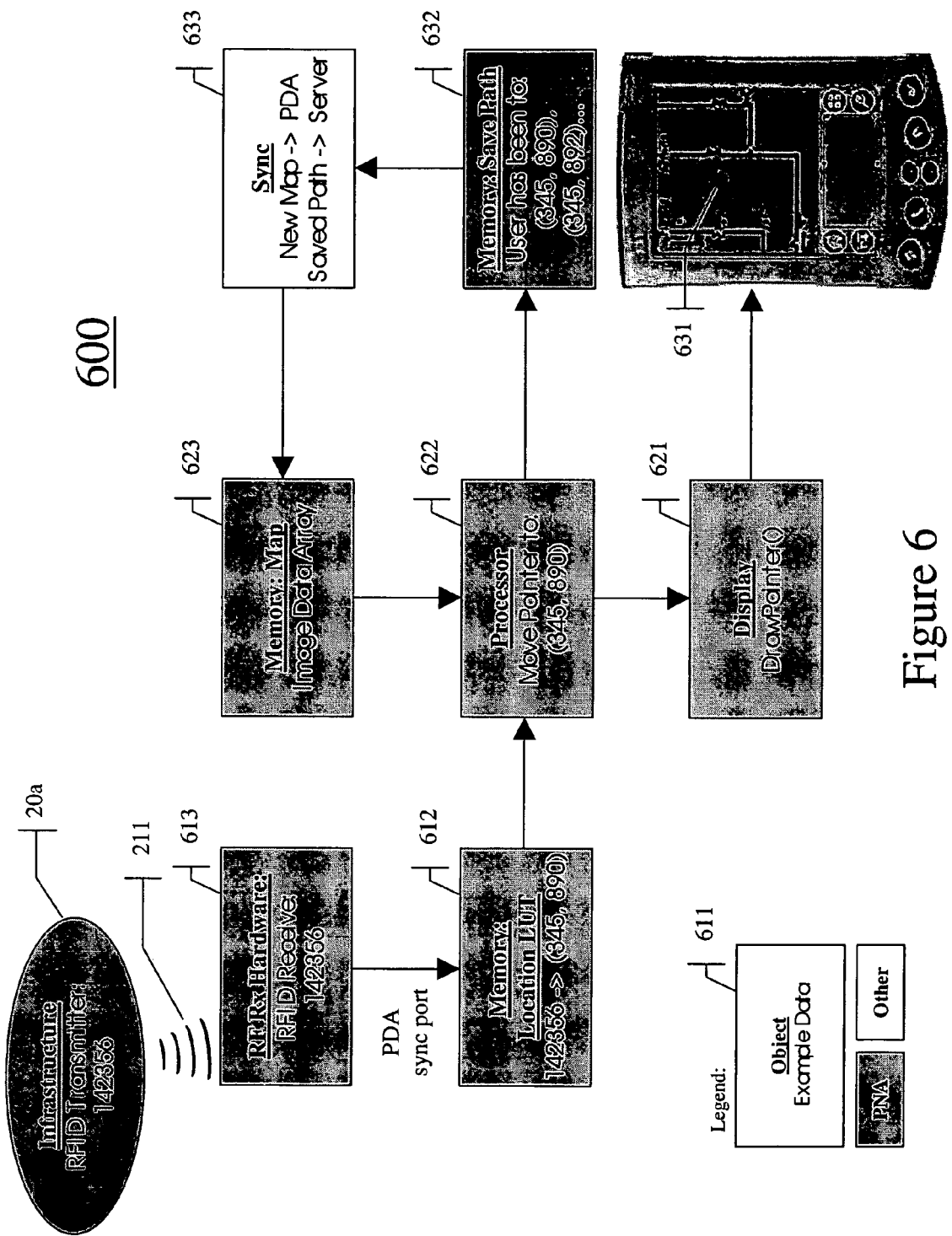
FIG. 6 is a simplified logic or flow diagram of software processing according to an aspect of the invention.

According to another aspect of the invention, the memory of the display/processor/memory device 316 of FIG. 3 is pre-loaded with software which includes at least a simplified plan of each floor of the building, together with the locations of the transmitters and their unique codes. The processing software responds to the receipt of the transmissions of transmitter 20a by producing or displaying an image of that region of the building in the vicinity of transmitter 20a. This might have an appearance generally similar to FIG. 1, preferably including the locations of building exits and important features of the building in the region depicted. In use by delivery persons, the software should display room numbers or room functions, or their equivalent. Also indicated on the display similar to FIG. 1 could be an arrow to indicate to the user a proposed direction of travel. Once the user enters a building, the user can indicate to the PDA 316 of FIG. 3 that he or she desires to travel to a certain room. The Processor 622 in FIG. 6 is capable of calculating a route from the current receiver/reader/display/processor/memory location to the destination of this certain room. The Processor hardware mentioned above contains software located in 622 of FIG. 6 to communicate to the Display routine 621 of FIG. 6 that it should draw an arrow indicator proposing to the user that he or she travel in this direction to reach the destination of this certain room. The same Processor and Display routines as above coordinate such that, as the user approaches the intersection of hallways or an elevator, an indication on the LCD 631 instructs the user to turn at this intersection or enter the elevator to change floors, respectively. Supplemental communication with the user could be achieved through the use of voice annunciation of the names of the hallways and/or turns the user should make while following the plotted path.

The radiation patterns provided by the various transmitters in a hallway may be non-overlapping. Receipt of the transmission from transmitter 20a allows the personal unit 311 of FIG. 3 to infer its present location is in the vicinity of transmitter 20a. Given the record of past locations it has inferred, the unit can infer direction of travel in a building as on FIG. 1. For instance, if the unit currently sees a signal from transmitter 20a, and most-recently prior received a signal from 20b, it can infer that it is located just outside the range of 20b and is approaching 20a. Using this knowledge and assuming that it is located in a hallway, the unit can cause its display to show a moving marker which possesses an interpolated position based on the moving average of the unit's previous travel. If the unit then recognizes a signal from transmitter 20c, it can presume that the unit and user have turned the corner and are now heading in a new direction. The patterns and distances of radiated energy from the transmitters are arranged in this installation to not overlap. In this installation, the receiving unit need not measure the signal strength of the transmission, but the mere presence of a sufficient signal is enough information for coarse location identification. In this scenario, the receiver unit consists of receiver hardware and display/processor/memory hardware. For this scenario, communication necessary between these two pieces of hardware consists only of the ASCII-coded text of the tag number received.

Figure 4:
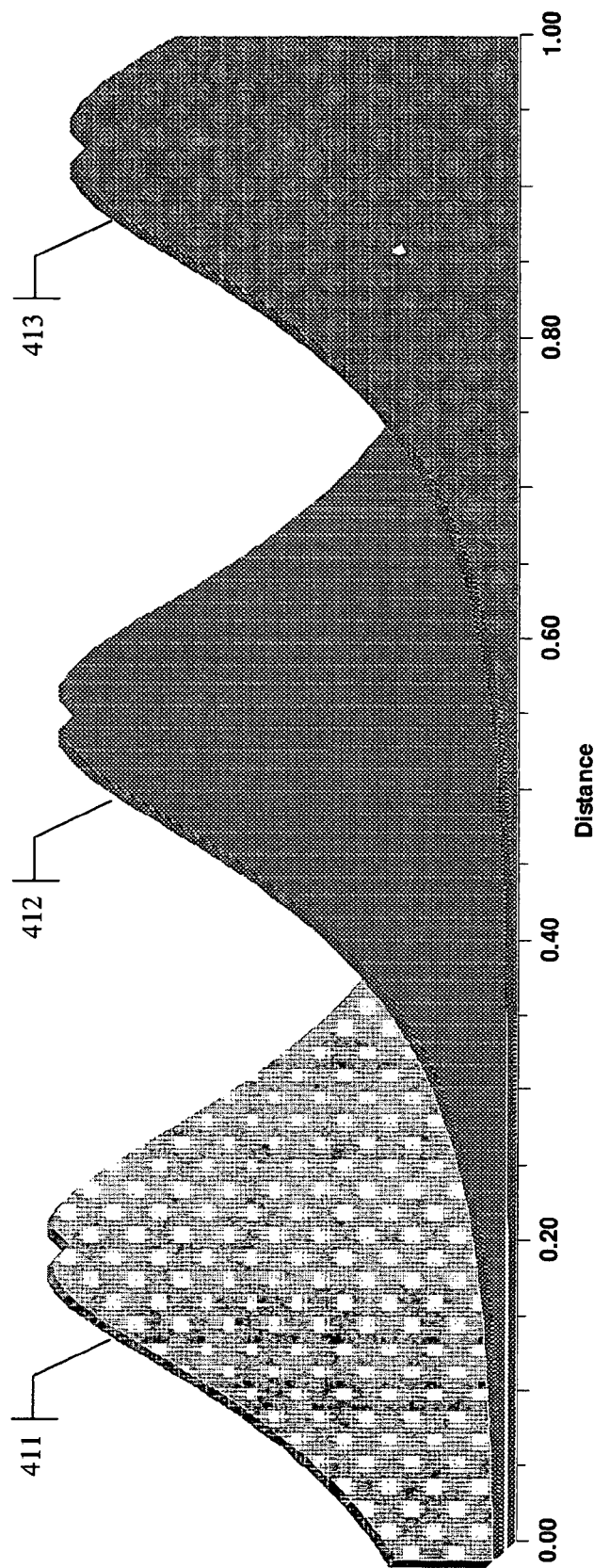
FIG. 4 is a plot of hypothetical broadcast energy distributions in a hallway.

The radiation patterns of the transmitters located in a hallway can be overlapping. In a long hallway in which more than one transmitter is mounted, the relative power levels of the received signal can be compared in order to assist in a more accurate determination of the approximate location of the person using the personal device 311 of FIG. 3. For example, FIG. 4 shows hypothetical radiated power at various distances from three isotropic or point sources. The point sources are spaced apart and are collinear. A first source is located at a normalized distance of 0.21 from an origin, a second source is located at a normalized distance of 0.56 and a third source is located at a normalized distance of 0.93, as indicated by the slightly notched peak amplitude values in FIG. 4. The power level produced as a function of distance by the first source is designated 411 in FIG. 4, the power level produced as a function of distance from the second source is designated 412, and that from the third source is designated 413. As known, the power level or density at locations remote from the sources decreases with increasing distance. In free space, the power decreases as the cube of the distance from the source. If a hypothetical receiver were to be placed at a location 0.32 units from the origin (0.00), relative values of the point sources could be measured such that the first source had an intensity of 0.22 more than the second source, which in turn had an intensity of 0.09 more than the third source. Under these extremely simplistic assumptions, a device could infer that it is closest to the first source and furthest from the third source. Since the device at 0.32 on the abscissa line also receives some radiated power from the second source, it could further infer that it is in the vicinity of the second source. If the device assumes it is collinear with the three sources and if it includes the above inferences, it could conclude that it is located on the abscissa line, between the first and second sources, but closer to the first source than to the second source. In this above scenario, said receiver hardware communicates with display/processor/memory hardware. For this scenario, communication necessary between these two pieces of hardware consists of the ASCII-coded text of the multiple transmitter/tag numbers received as well as the ASCII-coded text of the normalized, relative signal strengths of the received tag transmissions respective to the aforementioned tag numbers. The processor hardware then ranks the signal strengths from strongest to weakest as a pre-processing step for inferring its current location. Further assumptions and inferences are necessary to use this information to refine the current location from the coarse location discussed above. Such inferences can include time-stamped records indicating previously-strong signals and tag identities as well as pre-programmed knowledge of average speeds of human locomotion and transit.

It would be very advantageous for the user of a personal receiving device, such as 311 of FIG. 3, to be able to simply load the memory at the time he or she enters the building. This could be accomplished by coupling the personal device to a loading device located at the entrance(s) of the building. For this purpose, the loading device might be fitted with cables having adapters for each potential type of interface which might be encountered. A more convenient method for loading the necessary information would be automatically and by wireless means, as by way of a wireless local area network.

Figure 5:
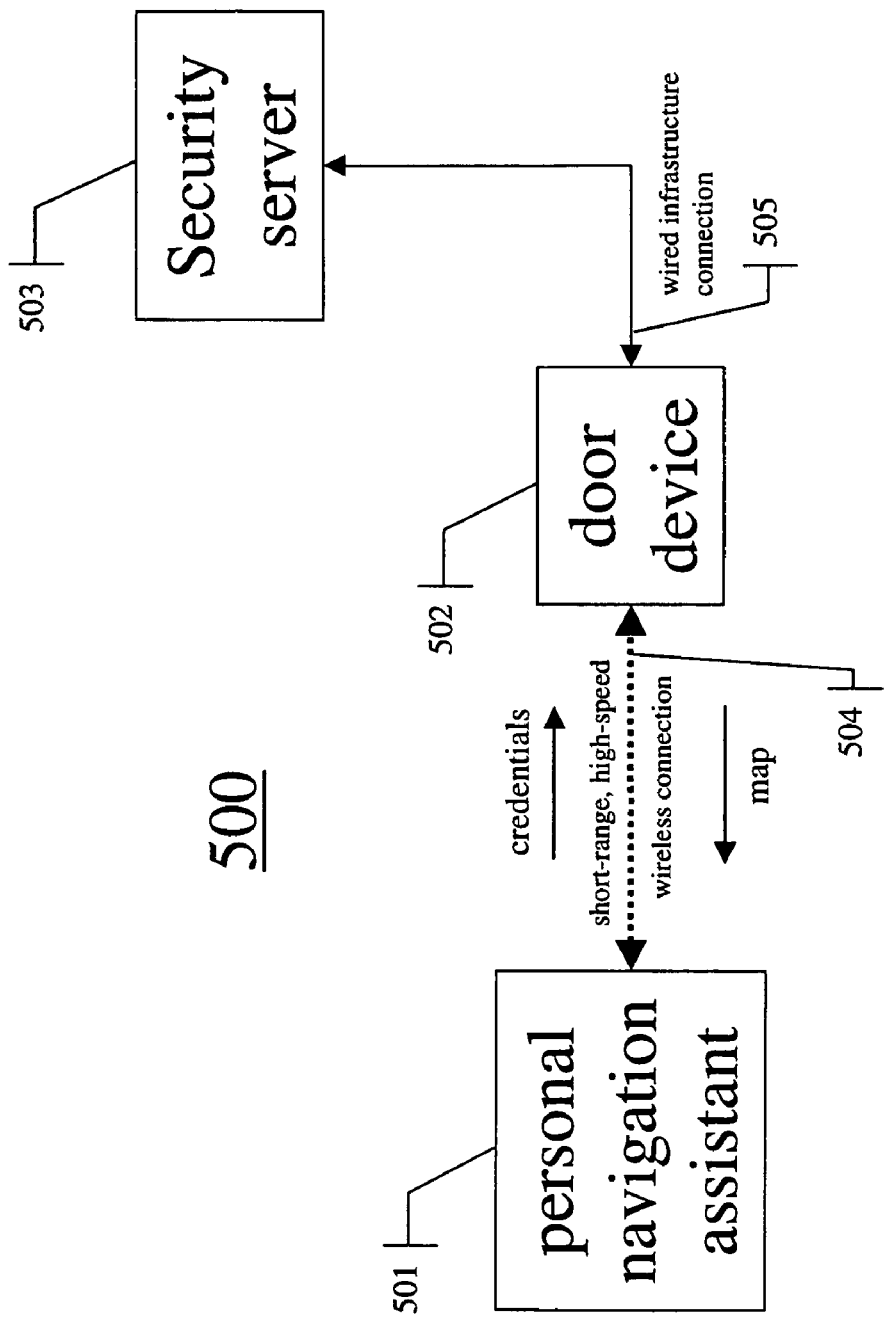
FIG. 5 is a simplified block diagram of a building-entrance configuration according to an aspect of the invention.

FIG. 5 illustrates a system 500 which represents a loading device which provides wireless communications within a building, or at least within the lobby or entrance regions of a building. In lieu of an electronic device known as an RFID badge as is currently used, an employee, a contractor, or delivery personnel will present their employer-issued electronic device or a personal navigation assistant 501 to gain entrance to a company building. A low-range, high-speed data transfer will occur over a connection, illustrated as 504, between the personal navigation assistant and a wireless access point 502. The communications over the wireless path 504 may include the transmission of credentials from the personal navigation assistant 501 to the entrance or door device 502, and the transmission of current map information in the reverse direction. The wireless access point, if of short range, may be located at the position previously occupied by an RFID badge reader. After verifying the personal navigation assistant's and therefore the personnel's credentials with the building's security department server 503 via the wired network 505, an up-to-date building layout is transferred from the security server 503, through the wire network 505, the access point 502, the wireless connection 504, and finally to the now-authenticated device 501. If a checksum of the current building map matches the checksum of a previously-loaded map on the device, the transfer is aborted. Once the authentication and/or transfer is complete, the door to the building is unlatched (or other admission means are enabled) and the person is allowed to enter with the device 501.

Having a building infrastructure of tags/transmitters and a receiver/reader/memory antenna won't do a user much good. Knowing he is at "284765220875" gives the user no more clue about his or her current location than not knowing. FIG. 6 is a simplified block diagram 600 which illustrates conversion of the numbers into useful location information. In the blocks discussed, refer to the Legend 611 for designations of block object names and their referenced example data. One RFID tag or transmitter is designated 20a in FIG. 6. For definiteness, the transmitter unit of FIG. 6 is transmitter unit 20a of FIG. 1. The building also includes other RFID tags, which are not illustrated for ease of understanding. The digital data this transmitter is providing or transmitting the representative number "142356". The tag/transmitter 20a transmits its data over air space 211 to the receiver/reader/memory 613. The crescents labeled 211 indicate the electromagnetic signal just as in FIG. 2a where the crescents are also designated 211. Receiver/reader/memory 613 includes radio-frequency (RF) hardware (RFID receiver) able to convert electromagnetic waves from its antenna into a data stream. The data stream is sent from block 613 to the device containing the human interface, processor and memory. In the embodiment of FIG. 6, these services are performed by a personal digital assistant (PDA). The first processing done to the example data "142356" is its application to a look-up table (LUT) 612 as contained in the PDA memory. This LUT is the decoder which converts the useless tag data "142356" into a grid coordinate on the map. In this case, the data "142356" look-up results in the production of grid coordinates corresponding to "142356", which coordinates are designated as "(345,890)" for definiteness. In this embodiment, those coordinates indicate a position on the map stored in a portion or large section of memory 623. The grid coordinate information is coupled from block 612 to a processor block 622. Processor 622 combines a map produced by block 623 with the map coordinates "(345,890)" from block 612, and directs the Display routine, illustrated as a block 621, to draw the corresponding map, together with a pointer, arrow or other such indicator at the coordinates specified. This rendered image is then displayed to the user in the PDA display 631, (which may be a LCD). The Processor 622 and Display routine 621 can also coordinate to provide pre-recorded voice constructs announcing the user's location, such as the name of the particular hallway or the approach of an imminent turn in the case of the user's following of a route. The Processor 622 also makes a note of the above-mentioned coordinate location by saving it to a log in a section of memory 632. Many such coordinates taken together form a path of proverbial "breadcrumbs" showing where the user has been. Once the user's business in this building is complete, the user and the PDA will arrive at an exit to the building. It is here that synchronization 633 between the PDA and other information storage occurs. This synchronization is also shown as 504 in FIG. 5. The user's saved path is uploaded for later reference, possibly by Security personnel, to confirm adherence to location restrictions. An updated map is downloaded to the PDA and stored 623 for the next use in navigating the building.

Other embodiments of the invention will be apparent to those skilled in the art. For example, parallel transmission of information may be used between the RF receiver and the digital signal processing rather than serial transmission, if desired.

A system according to an aspect of the invention comprises a transmitter (20a, 20b, . . . ) unit at a known, fixed location within a building, transmitting a wireless signal unique to that location. A portable receiver or receiver/reader/memory (314) is located somewhere with the building, for receiving the wireless signal transmissions from the transmitter (20a, 20b, . . . ) unit. A processor (316) is associated with the portable receiver (314), for storing information relating to the physical environment around at least the known location and information identifying the signal unique to the location, and for processing the signal unique to the location in conjunction with the information relating to the physical environment, for producing a human-sensible indication of the known location relative to the environment, such as a map (631) of the environment around at least the known location. In one advantageous embodiment, the processor (316) portion of the system (310) is able to plot a route from the current location to a user-specified destination. In addition, the map may indicate a proposed direction of travel to progress toward a destination. Ideally, the processor (316) is co-located with the portable receiver (314) and antenna (312) in a Package arrangement (311).

In one version of the system, the receiver (314) unit corresponds or communicates with the processor (316) unit, communicating the identities of the signal(s) it receives over interface (318). In a particularly advantageous version, the communication between receiver (314) and processor (316)) not only contains received signal identities, but also received signal strengths in a normalized, relative measurement. In such a system, the signal information representative of the strength of the wireless signal is processed to determine which signal of numerous signals is strongest and presumed to be within closest proximity, which is second, and so on until all sufficiently-received signals are ranked.

In another version, a memory segment (626, 632) or log allocates space for storing signal identities provided to the processor (316), together with the time at which they were received, and signal strength if applicable in the particular system's design.

An electromagnetic signal transmitter (20a, 20b, . . . ) unit according to another aspect of the invention comprises a memory (216, 218) for storing at least one of a static or selectable code representative of a particular fixed location of the transmitter (20a, 20b, . . . ) unit, and an electromagnetic signal generator (212, 214, 216, 220) operating at a frequency in an Industrial, Scientific, and Medical band, for generating signals to be transmitted, which signals are modulated by the code. A directive antenna arrangement (210) is coupled to the electromagnetic signal generator (212, 214, 216, 220), for directing electromagnetic radiation in a desired direction, and timing means (224) coupled to at least one of the memory (216), the electromagnetic signal generator (212, 214, 216, 220), and the antenna arrangement (210), for recurrently enabling transmission of the electromagnetic signals. The timing means (224) causes the recurrence more frequently than every ten seconds, and more preferably about every five seconds.

In one version of a system (310) according to an aspect of the invention, the radiation patterns of the transmitter (20a, 20b, . . . )s are intentionally selected, in conjunction with the installation of the transmitter (20a, 20b, . . . )s at fixed locations, in such a manner that overlap is reduced to a minimum. In another type of installation, the radiated energy patterns are selected in conjunction with the installation locations of the transmitters (20a, 20b, . . . ) so as to partially overlap.

According to an aspect of the invention, the transmitted power from each transmitter (20a, 20b, . . . ) is no greater than one of 50 millivolts per meter and 0.75 µwatts EIRP at three meters. In some versions, the power source for the transmitters (20a, 20b, . . . ) is provided in whole or in part from the power mains. In at least one aspect, the power for the transmitters (20a, 20b, . . . ) is provided, at least in part, by solar cells.

A portable unit (311) according to yet another aspect of the invention is for, in a building, receiving signals from a transmitter (20a, 20b, . . . ) unit at a known, fixed location within the building. The transmitter (20a, 20b, . . . ) unit transmits a wireless signal unique to that known fixed location. The portable unit (311) comprises a processor/display/memory arrangement (316), for storing information relating to the physical environment around at least the known location, and information identifying the signal unique to the location. The processor/display/memory arrangement (316) processes the signal unique to the location in conjunction with the information relating to the physical environment, for producing a human-sensible indication of the known location relative to the environment. The human-sensible indication may be a map.

What is claimed is:

1. A system comprising:
   a transmitter unit at a known, fixed location within a building, transmitting a wireless signal unique to that location;
   a portable receiver or receiver/reader/memory located with said building, for receiving said wireless signal transmissions from said transmitter unit,
   a processor co-located with said portable receiver, for storing information relating to the physical environment around at least said known location and information identifying said signal unique to said location, and for processing said signal unique to said location in conjunction with said information relating to the physical environment, for producing a human-sensible map of said environment around at least said known location
   in which communications between said receiver and processor contain not only received signal identities, but also received signal strengths in a normalized, relative measurement; and
   wherein said signal strengths are processed to determine which signal of numerous signals is strongest and presumed to be within closest proximity, which is second, and so on until all sufficiently-received signals are ranked.

2. A system, comprising:
   a transmitter unit at a known, fixed location within a building, transmitting a wireless signal unique to that location;
   a portable receiver or receiver/reader/memory located with said building, for receiving said wireless signal transmissions from said transmitter unit;
   a processor associated with said portable receiver, for storing information relating to the physical environment around at least said known location and information identifying said signal unique to said location, and for processing said signal unique to said location in conjunction with said information relating to the physical environment, for producing a human-sensible indication of said known location relative to said environment, wherein said transmitter unit comprises:
      a memory for storing at least one of a static or selectable code representative of a particular fixed location of said transmitter unit;
      an electromagnetic signal generator operating at a frequency in an Industrial, Scientific, and Medical band, for generating signals to be transmitted, modulated by said code;
      a directive antenna arrangement coupled to said electromagnetic signal generator, for directing electromagnetic radiation in a manner to prevent overlapping of the radiated energy patterns with other corresponding transmitter units of said system; and
      timing means coupled to at least one of said memory, said electromagnetic signal generator, and said antenna arrangement, for recurrently enabling transmission of said electromagnetic signals.

3. A system, comprising:
   a transmitter unit at a known, fixed location within a building, transmitting a wireless signal unique to that location;
   a portable receiver or receiver/reader/memory located with said building, for receiving said wireless signal transmissions from said transmitter unit;
   a processor associated with said portable receiver, for storing information relating to the physical environment around at least said known location and information identifying said signal unique to said location, and for processing said signal unique to said location in conjunction with said information relating to the physical environment, for producing a human-sensible indication of said known location relative to said environment, wherein said transmitter unit comprises:
      a memory for storing at least one of a static or selectable code representative of a particular fixed location of said transmitter unit;
      an electromagnetic signal generator operating at a frequency in an Industrial, Scientific, and Medical band, for generating signals to be transmitted, modulated by said code;
      a directive antenna arrangement coupled to said electromagnetic signal generator, for directing electromagnetic radiation in a manner such as to overlap with the electromagnetic radiation of adjacent ones of said transmitter units; and
   timing means coupled to at least one of said memory, said electromagnetic signal generator, and said antenna arrangement, for recurrently enabling transmission of said electromagnetic signals.

4. A system, comprising:
- a transmitter unit at a known, fixed location within a building, transmitting a wireless signal unique to that location;
- a portable receiver or receiver/reader/memory located with said building, for receiving said wireless signal transmissions from said transmitter unit;
- a processor associated with said portable receiver, for storing information relating to the physical environment around at least said known location and information identifying said signal unique to said location, and for processing said signal unique to said location in conjunction with said information relating to the physical environment, for producing a human-sensible indication of said known location relative to said environment, wherein said transmitter unit comprises:
- a memory for storing at least one of a static or selectable code representative of a particular fixed location of said transmitter unit;
- an electromagnetic signal generator operating at a frequency in an Industrial, Scientific, and Medical band, for generating signals to be transmitted, modulated by said code;
- a directive antenna arrangement coupled to said electromagnetic signal generator, for directing electromagnetic radiation; and
- timing means coupled to at least one of said memory, said electromagnetic signal generator, and said antenna arrangement, for recurrently enabling transmission of said electromagnetic signals; wherein said transmitter produces said wireless signal with a particular Equivalent Isotropic Radiated Power (EIRP).

* * * * *